United States Patent [19]

Harms et al.

[11] Patent Number: 5,780,621
[45] Date of Patent: Jul. 14, 1998

[54] ALUMINUM PHTHALOCYANINE REACTIVE DYES

[75] Inventors: Wolfgang Harms; Karl-Josef Herd, both of Odenthal; Willi Brust, Wermelskirchen, all of Germany

[73] Assignee: Bayer Aktiengesellschaft, Germany

[21] Appl. No.: 694,041

[22] Filed: Aug. 8, 1996

[30] Foreign Application Priority Data

Aug. 14, 1995 [DE] Germany ............... 195 29 853.5

[51] Int. Cl.$^6$ ............... C07D 487/22; C09B 62/26
[52] U.S. Cl. ............... 540/140; 540/122; 540/123; 540/124; 540/125; 540/126; 540/127; 540/131; 540/134; 8/661
[58] Field of Search ............... 540/140, 122, 540/123, 124, 125, 126, 127, 131, 134

[56] References Cited

U.S. PATENT DOCUMENTS

| | | | |
|---|---|---|---|
| 4,166,718 | 9/1979 | Reinert et al. | 8/111 |
| 4,530,924 | 7/1985 | Polony et al. | 514/191 |
| 4,540,518 | 9/1985 | Eckhardt et al. | 260/242.2 |
| 4,566,874 | 1/1986 | Hölzle et al. | 8/103 |
| 4,576,755 | 3/1986 | Mischke et al. | 260/245.78 |
| 4,935,501 | 6/1990 | Tzikas | 534/634 |
| 5,070,193 | 12/1991 | Schündehütte et al. | 540/125 |
| 5,126,443 | 6/1992 | Moser et al. | 540/125 |
| 5,455,334 | 10/1995 | Wald | 534/624 |
| 5,608,053 | 3/1997 | Thetford et al. | 540/140 |

FOREIGN PATENT DOCUMENTS

| | | |
|---|---|---|
| 0 035 470 A1 | 9/1981 | European Pat. Off. . |
| 0 081 462 A2 | 6/1983 | European Pat. Off. . |
| 0 611 259 A1 | 8/1994 | European Pat. Off. . |
| 28 12 261 A1 | 9/1978 | Germany . |
| 28 12 278 | 9/1978 | Germany . |
| 39 30 738 A1 | 3/1990 | Germany . |
| 43 38 853 A1 | 5/1995 | Germany . |
| 195 21 056 A1 | 12/1995 | Germany . |
| 371540 | 10/1963 | Switzerland . |
| 2 219 804 | 12/1989 | United Kingdom . |
| 2 290 548 | 1/1996 | United Kingdom . |

OTHER PUBLICATIONS

H. Rath, Lehrbuch der Textilchemie [Textbook of Textile Chemistry], Springer–Verlag, 3rd. Ed. (1972) pp. 295–299.
J. Soc. Dyers and Colourists 1972, pp. 93–99.
J. Soc. Dyers and Colourists 1975, pp. 33–37.

Primary Examiner—Mukund J. Shah
Assistant Examiner—Pavanaram K. Sripada
Attorney, Agent, or Firm—Connolly & Hutz

[57] ABSTRACT

Phthalocyanines of the formula $$\left[ \begin{array}{c} AlPc \\ | \\ X \end{array} \right] \begin{array}{c} -(SO_3H)_a \\ -(SO_2NR^1R^2)_b \\ -(SO_2-B-Z)_c \end{array} \quad (I)$$

in which
Z is a fiber-reactive radical and the other substituents and indices have the meaning given in the description, have improved use properties.

14 Claims, No Drawings

ALUMINUM PHTHALOCYANINE REACTIVE DYES

The invention relates to novel phthalocyanine reactive dyes, their preparation and their use.

Turquoise-colored and green reactive dyes based on phthalocyanines, in particular copper phthalocyanine and nickel phthalocyanine, for dyeing cotton are known, for example, from EP-A 611 259 and DE-A 3 930 738. It is furthermore known from DE-A 2 812 278 and 2 812 261 to use aluminum phthalocyanines for bleaching textiles and for combating microorganisms. However, the phthalocyanines employed for dyeing still have disadvantages in respect of use properties, in particular in combination dyeings with other reactive chromophores.

The invention relates to aluminum phthalocyanine reactive dyes which, in the form of the free acid, correspond to the following formula $$\left[ \begin{array}{c} AlPc \\ | \\ X \end{array} \right\{ \begin{array}{c} (SO_3H)_a \\ (SO_2NR^1R^2)_b \\ (SO_2-B-Z)_c \end{array} \right. \quad (1)$$

in which
a=a number from 0 to 3,
b=a number from 0 to 2,
c=a number from 0.5 to 3, wherein the sum of a+b+c is preferably not less than 2 and not greater than 4, $R^1$ and $R^2$=independently of one another are H, $C_1$-$C_6$-alkyl, substituted $C_1$-$C_6$-alkyl, in particular $C_1$-$C_6$-alkyl substituted by OH, $SO_3H$, $CO_2H$ or $OSO_3H$, phenyl, substituted phenyl, in particular phenyl substituted by OH, $SO_3H$ and $CO_2H$, or a fiber-reactive radical with a sulfonyl group, in particular a radical of the structure $$-(CH_2)_n-\underset{m}{\underbrace{\bigcirc}}-(W)-SO_2Y \quad (I)$$

in which
n=0 to 3,
m=0 or 1
but n+m=1, 2, 3 or 4,
W=—$(CH_2)_{1-6}$, —$(CH_2)_2$—O—$(CH_2)_2$— or a direct bond,
Y=CH=$CH_2$, $CH_2CH_2Cl$, $CH_2CH_2OH$ or $CH_2CH_2OSO_3H$,
or the grouping $NR^1R^2$=the radical of a saturated heterocyclic ring system, such as, for example,

—N⟨O; —N⟨ ; —N⟨ ⟩;

—N⟨SO_2 or —N⟨NCH_2CH_2OH,

B=an N-containing bridge member which is linked to the $SO_2$ radical via an N atom,
Z=a fiber-reactive radical and
X=OH, $OR^3$ or a phthalocyanine radical linked via a bonding member, in particular oxygen, in particular a radical of the formula (II)

$$-O-\left[ AlPc \right\{ \begin{array}{c} (SO_3H)_a \\ (SO_2NR^1R^2)_b \\ (SO_2-B-Z)_c \end{array} \right. \quad (II)$$

in which the substituents $R^1$, $R^2$, B and Z in (II) have one of the meanings given for these substituents under formula (1), preferably the identical meaning or
X=an anion, in particular sulfate, carbonate, acetate, hydrogen sulfate and bicarbonate,
$R^3$=$C_1$-$C_6$-alkyl, which can optionally be substituted by OH, halogen or $C_1$-$C_4$-alkoxy, or phenyl, which can optionally be substituted by OH, $SO_3H$, $CO_2H$, $C_1$-$C_4$-alkyl, $C_1$-$C_4$-alkoxy or halogen, and
Pc=a radical of the phthalocyanine ring system of the formula in which the carbocyclic six-membered rings can additionally be, substituted by halogen, specifically chlorine, $C_1$-$C_6$-alkyl, $C_1$-$C_6$-alkoxy or other substituents customary in the chemistry of aromatics. The substituents $SO_3H$, $SO_2NR^1R^2$ and $SO_2BZ$ mentioned in (1) are, as is known, preferably in the 3-position.

Preferred dyes of the formula (1) are those where X=OH or a radical of the formula (II) in which the carbocyclic six-membered rings of the Pc skeleton contain no further substituents.

Preferred dyes of the formula (1) are furthermore those in which $$B = -R^4N-\underset{E}{\underbrace{\bigcirc}}-NR^5-,$$

—$NR^4$—$(CH_2)_{2-6}$—$NR^5$—, —$NR^4$—$CH_2$—CH—$NR^5$—,
                                                              |
                                                              $CH_3$

—N⟨ ⟩N— or

—N⟨ ⟩N—$CH_2$—$CH_2$—NH—, in which
$R^4$ and $R^5$=independently of one another H, $CH_3$, $C_2H_5$, $CH_2CH_2OH$, $CH_2CO_2H$ or $CH_2CH_2CO_2H$ and
E=H, $SO_3H$, $CO_2H$, $CH_3$, $C_2H_5$, $CH_3O$ or $C_2H_5O$, and Z=a fiber-reactive heterocyclic radical, in particular from the triazine, pyrimidine or quinoxaline series, and in which the substituents and indices a, b, c, $R^1$, $R^2$ and X have the abovementioned meaning.

Triazines, pyrimidines and quinoxalines which contain only halogen or halogen and an amino group as substituents are preferred as the fiber-reactive radical Z.

Dyes (1) which are furthermore preferred are those in which

—B—Z=a radical of the following formulae (I), (IV) and (V)

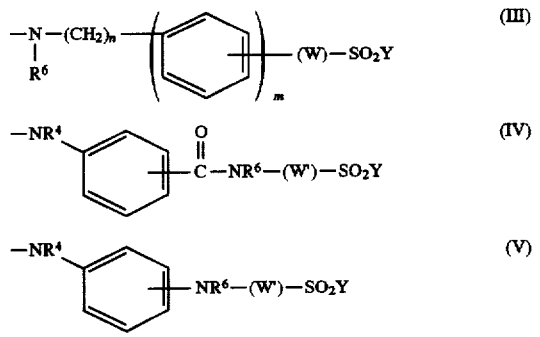

in which n, m, W and Y have the meanings as under formula (I), $R^4$ has the abovementioned meaning, $W^1$=—$(CH_2)_{2-3}$—, —$(CH_2)_2$—O—$(CH_2)_2$— or phenylene, $R^6$=H, $CH_3$, $C_2H_5$, phenyl, sulfophenyl or a radical of the formula (I) where m=0, and the other substituents and indices a, b, c, $R^1$, $R^2$ and X have the meaning given under formula (1).

Dyes of the formula (1) which are furthermore preferred are those in which the

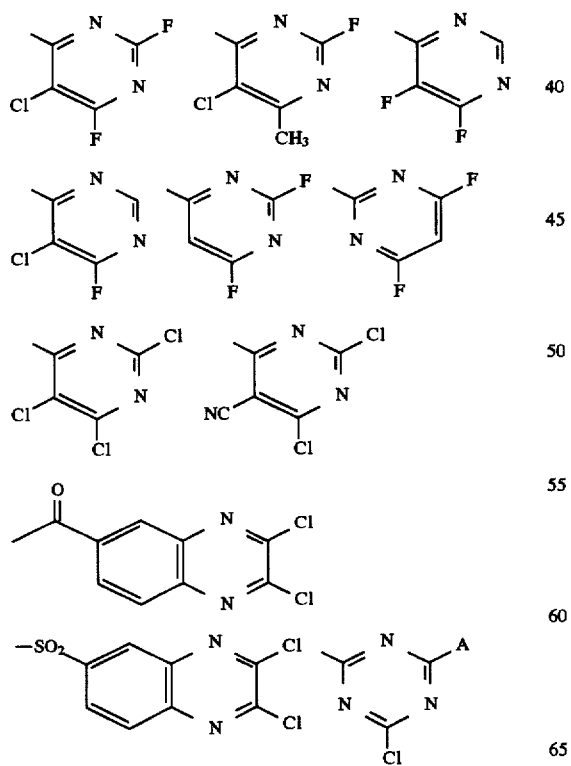

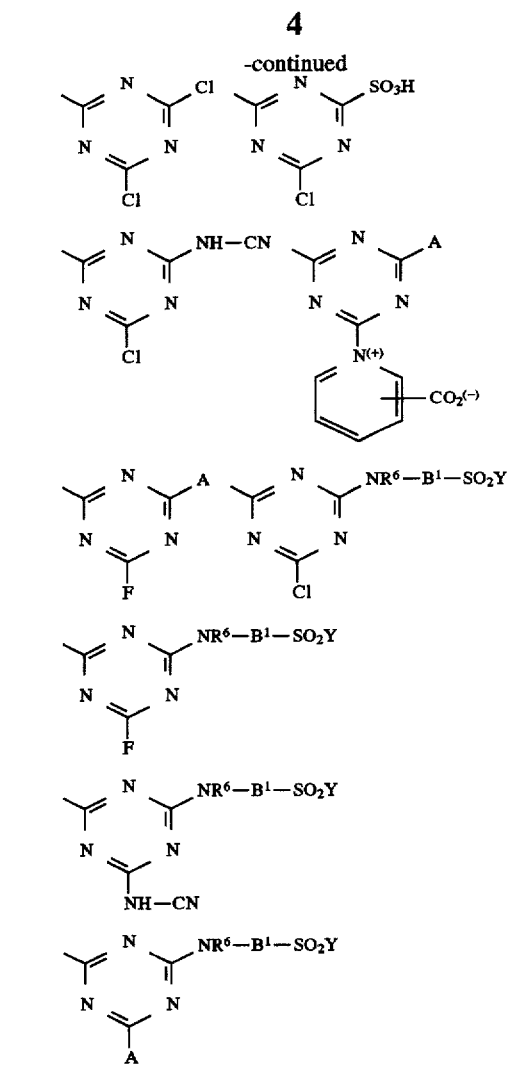

in which A=$NH_2$, $NHR^7$, $NR^7R^8$, OH, $OR^7$, SH, $SR^7$, $SO_2R^7$,

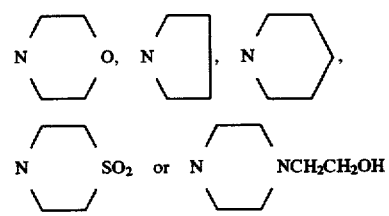

and $R^7$, $R^8$=independently of one another $C_1$–$C_6$-alkyl, $C_1$–$C_6$-alkyl which is substituted by OH, $SO_3H$, $OSO_3H$ or $CO_2H$, phenyl or naphthyl, or phenyl or naphthyl which is substituted, optionally polysubstituted, by OH, $SO_3H$ or $CO_2H$, and $B^1$=alkylene, phenylene or naphthylene, specifically —$(CH_2)_2$—, —$(CH_2)_3$— or —$(CH_2)_2$—O—$(CH_2)_2$—,

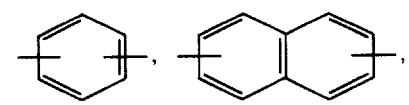

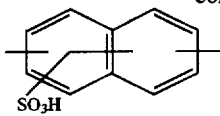

and $R^6$ and Y have the meanings already mentioned above.

Dyes of the formula (1) which are furthermore preferred are those in which the bridge member B has the meaning of a radical of the formula (VI)

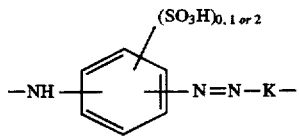

in which the fiber-reactive radical Z is bonded to K, and

K=a coupling component from the series consisting of pyrazolones, pyridones, naphthols, aminonaphthols and amino- and diaminobenzenes, specifically a pyridone of the structure

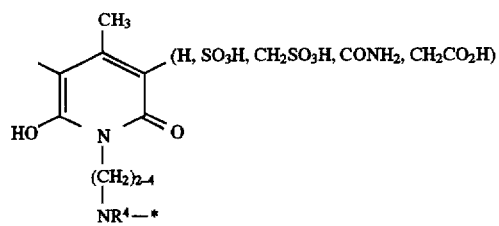

The asterisk marks the linking position with the fiber-reactive radical Z.

Novel reactive dyes which are particularly preferred are those of the formulae (2) to (7)

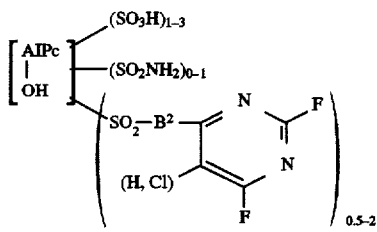

wherein

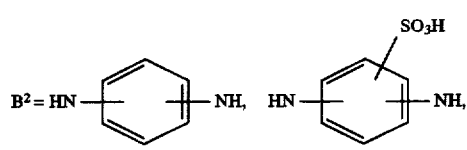

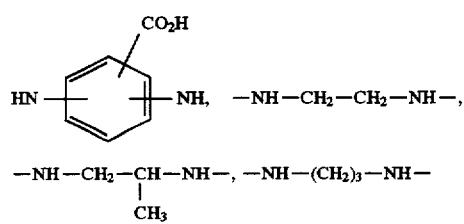

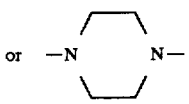

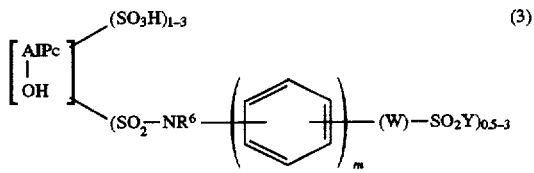

in which $R^6$, Y and m have the meaning already given above, specifically dyes of the formulae (3a), (3b) and (3c)

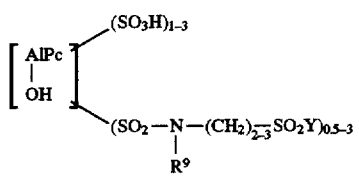

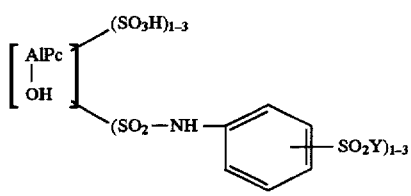

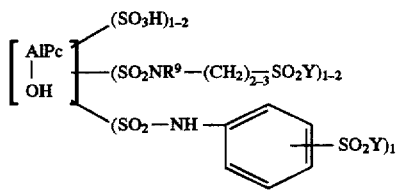

in which $R^9$=H, $CH_3$, $C_2H_5$, phenyl or $-(CH_2)_{2-3}-SO_2Y$

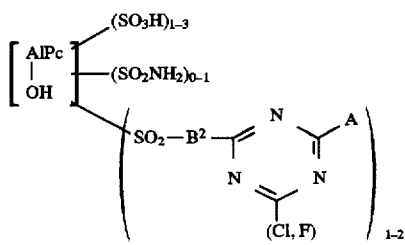

in which $B^2$ and A have the abovementioned meaning,

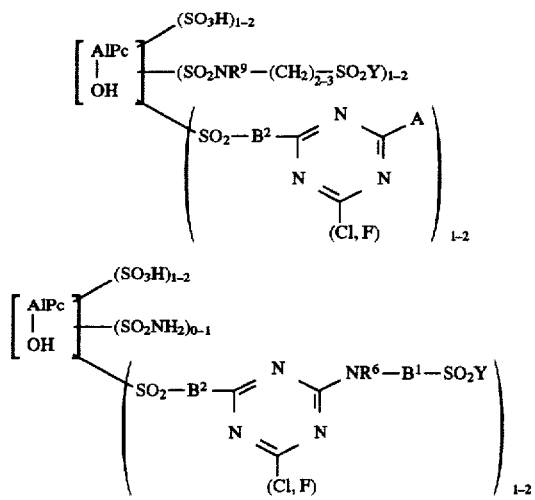

in which $R^6$, $B^1$ and $B^2$ have the meaning already given above.

The formulae shown are those of the free acids. The salts obtained during the customary preparation, in particular the alkali metal salts or ammonium salts, are in general employed.

The dyes (1) are prepared, for example, by reacting the A1 phthalocyanine-sulfonic acid chlorides known from EP-A 35 470, U.S. Pat. No. 4,166,718 and EP-A 81 462, of the formula (8)

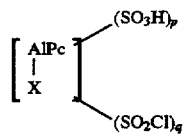

in which
p=0 to 3 and
q=1 to 4, with the proviso that p+q=2, 3 or 4, with amines of the formula (9)

$$H—B—Z \quad (9)$$

and if appropriate with amines of the formula (10)

$$HNR^1R^2 \quad (10)$$

and then hydrolyzing any sulfonic acid chloride groups still present.

If amines (9) and (10) are employed, these can be reacted with (8) in succession or simultaneously.

The novel reactive dyes of the formula (1) are also prepared, for example, by subjecting dye intermediate products of the formula (11)

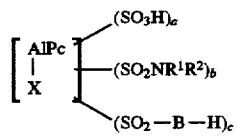

to a condensation reaction on a further N atom in B with triazine, pyrimidine or quinoxaline reactive components of the formula (12)

$$Z—Hal \quad (12)$$

in which Hal=Cl, Br or F, hydrogen halide being split off.

Compounds (11) are obtainable by subjecting acid chlorides of the formula (8) to a condensation reaction with amines (10) and/or diamines H—B—H, or subjecting, them to a condensation reaction with amines (10) and/or amines H—B—acyl (13), in which an amine function in the diamine H—B—H is protected by a hydrolyzable, acyl group [=acyl (for example formyl, acetyl, benzoyl and the like)] and then, hydrolyzing the acylamino group.

Novel reactive dyes of the formula (1) where B=a radical of the formula (VI) are prepared by methods as described under EP 611 259 A1.

Amines of the formula (9) can be prepared by conversion of one side of the corresponding diamines H—B—H with Z-Hal.

The reaction of the A1 phthalocyanine-sulfochlorides of the formula (8) with the amines of the formulae (9), (19) and (13) is preferably carried out in aqueous solution or suspension at temperatures of 0° to 40° C. and pH values of 2 to 10. The hydrolysis of the acylamino group in compounds of the formula (14)

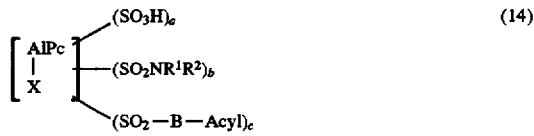

which result after reaction of (8) with (13), can be carried out both in an acid and in an alkaline medium, preferably at temperatures from 70° to 80° C.

The reaction of dyes of the formula (11) with Z—Hal (12) is preferably carried out in aqueous solution or suspension at pH 4 to 9 and 0° to 60° C.

The novel dyes are outstandingly suitable for dyeing and printing textile materials containing hydroxyl and amide groups, for example those of cellulose, wool or synthetic polyamides. They are employed in accordance with customary methods.

The dyeings and prints have an outstanding level of fastness.

The novel reactive dyes can be employed both as a powder or granules and as aqueous concentrated solutions. The invention furthermore relates to textile products comprising materials containing hydroxyl or amide groups which have been dyed using dyes of the formula (1).

In a preferred embodiment, the dyes are used as granules. The granules of the dyes can be obtained in the following steps:

Mixing granulation

In this case, the dye powder is moistened with 15 to 55% of water—based on the mixture of the powder—and the mixture is then shaped in a mixing granulator and subsequently dried, and the dust is removed, the dust removal agent being sprayed onto the granules as an aerosol mixture.

Spray granulation

In this case, the synthesis solution or suspension is simultaneously dried and granulated in a fluidizing spray dryer.

The dye powder or dye granules in general comprise (in % by weight) 30 to 80% of a reactive dye of the formula (1) and 5 to 15% of water, in each case based on the total composition. In addition, they can also comprise inorganic salts, such as alkali metal chlorides or alkali metal sulfates, dispersing agents and dust removal agents.

Preferred mixtures of solids additionally comprise buffer substances which give a pH of 3.5 to 7.5, in particular 4.5 to 6.5, when the mixtures are dissolved in 20 times the amount of water (based on the weight of the dye finished form).

These buffer mixtures are added in amounts of 3 to 50, in particular 5 to 15% by weight, based on the total weight.

Aqueous reactive dye solutions in general comprise 5 to 50% of a dye of the formula (1) (based on the total weight of the solution).

Preferred aqueous reactive dye solutions additionally comprise buffer substances and have a pH of 3.5 to 7.5, in particular 4.5 to 6.5. These buffer substances are preferably added in amounts of 0.1 to 50%, in particular 1 to 20% by weight, based on the total weight.

The buffers used are inert toward the reactive groups. Examples of buffers are: sodium dihydrogen phosphate, disodium hydrogen phosphate, potassium dihydrogen phosphate, dipotassium hydrogen phosphate, sodium acetate, potassium acetate, sodium borate, potassium borate, sodium oxalate, potassium oxalate and sodium hydrogen phthalate. These buffers can be used by themselves or as a mixture.

The dyes according to the invention are particularly suitable for dyeing textile products, specifically for dyeing materials containing hydroxyl or amide groups.

Materials containing hydroxyl groups are those of natural or synthetic origin, such as, for example, cellulose fiber materials or regenerated products thereof and polyvinyl alcohols. Cellulose fiber materials are preferably cotton, but also other plant fibers, such as linen, hemp, jute and ramie fibers; regenerated cellulose fibers are, for example, viscose staple and filament viscose. Materials containing carboxamide groups are for example, synthetic and naturally occurring polyamides and polyurethanes, in particular in the form of fibers, for example wool and other animal hair, silk, leather, nylon 6,6, nylon 6, nylon 11 and nylon 4.

The compounds according to the invention can be applied to and fixed on the substrates mentioned, in particular on the fiber materials mentioned, by the application techniques known for water-soluble dyes, in particular by those known for water-soluble fiber-reactive dyes.

Thus, very good color yields are obtained with them on cellulose fibers by the exhaustion process from a long liquor using the most diverse acid-binding agents and if appropriate neutral salts, such as sodium chloride or sodium sulfate. Dyeing is preferably carried out in an aqueous bath at temperatures between 60° and 105° C., if appropriate at temperatures up to 120° C., under pressure and if appropriate in the presence of customary dyeing auxiliaries. A procedure can be followed here in which the material is introduced into the warm bath, which is gradually heated to the desired dyeing temperature, and the dyeing process is brought to completion at this temperature. If desired, the neutral salts, which accelerate exhaustion of the dye, can alternatively be added to the bath only after the actual dyeing temperature has been reached. The dyes are distinguished by more harmonious properties in uptake owing to the neutral salt and the subsequent addition of the acid-binding agent.

Excellent color yields with a very good appearance of the goods are likewise obtained on cellulose fibers by the padding process because of the better solubility compared with pure vinylsulfone dyes, it being possible for the dyes to be fixed in the customary manner by batching at room temperature or elevated temperature, for example up to about 60° C., by steaming or with dry heat.

Deep prints with a good contour status and a clear white background are likewise obtained by the customary printing processes for cellulose fibers, which can be carried out in one phase—for example by printing with a printing paste comprising sodium bicarbonate or another acid-binding agent and subsequent steaming at 100° to 103° C.—or in two phases—for example by printing with a neutral or weakly acidic printing ink and subsequent fixing, either by passing through a hot electrolyte-containing alkaline bath or by overpadding with an alkaline electrolyte-containing padding liquor with subsequent batching or steaming or dry heat treatment of the material overpadded under alkaline conditions. The quality of the prints depends only little on varying fixing conditions.

Hot air of 120° to 200° C. is used for fixing by means of dry heat by the customary thermofixing processes. In addition to the customary steam of 101° to 103° C., superheated steam and compressed steam with temperatures of up to 160° C. can also be employed.

The agents which are acid-binding and effect fixing on the cellulose fibers are, for example, water-soluble basic salts of the alkali metals and likewise the alkaline earth metals of inorganic or organic acids or compounds which liberate alkali under the influence of heat. The alkali metal hydroxides and alkali metal salts of weak to moderately strong inorganic or organic acids may be mentioned in particular, alkali metal compounds preferably meaning the sodium and potassium compounds. Such acid-binding agents are, for example, sodium hydroxide, potassium hydroxide, sodium carbonate, sodium bicarbonate, potassium carbonate, sodium formate, sodium hydrogen phosphate, disodium hydrogen phosphate, sodium trichloroacetate, water-glass or trisodium phosphate.

The compounds (dyes) according to the invention are bonded chemically to the cellulose fiber by the treatment of the compounds according to the invention with the acid-binding agents, if appropriate under the action of heat; on these fiber materials, they are distinguished by a high fixing yield when used in the dyeing and printing processes. After customary after-treatment by rinsing to remove non-fixed portions of dye, the cellulose dyeings show excellent wet-fastnesses, especially since non-fixed portions of dye can easily be washed out because of their good solubility in cold water.

The dyeings and prints produced with the compounds according to the invention are distinguished by very clear shades. In particular, the dyeings and prints on cellulose fiber materials have a good fastness to light and very good wet fastnesses, such as fastnesses to washing, milling, water, seawater, cross-dyeing and acid and alkaline perspiration, and furthermore a good fastness to pleating, fastness to ironing and fastness to rubbing.

The compounds according to the invention can furthermore also be used for fiber-reactive dyeing of wool. Wool which has been given a non-felting or low-felting treatment (cf., for example, H. Rath Lehrbuch der Textilchemie [Textbook of Textile Chemistry], Springer-Verlag, 3rd Edition (1972), pages 295 to 299, in particular treatment by the so-called Hercosett process (page 298); J. Soc. Dyers and Colourists 1972, 93 to 99, and 1975, 33 to 37) can also be dyed with very good fastness properties.

The process for dyeing on wool is carried out here in the customary and known dyeing procedure from an acid medium. Thus, for example, acetic acid and/or ammonium sulfate or acetic acid and ammonium acetate or sodium acetate are added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzenesulfonic acid and/or of an aminonaphthalenesulfonic acid, or based on a reaction product of, for example, stearylamine with ethylene oxide. Thus, for example, dyeing is first carried out by the exhaustion process from an acid dyebath having a pH of about 3.5 to 5.5, while controlling the pH, and, toward the end of the dyeing time, the pH is then shifted into the neutral or, if appropriate, weakly alkaline range up to a pH of 8.5, in particular to bring about complete reactive bonding with the fiber to achieve good depths of color. At the same time, the dye content which is not bonded reactively is dissolved off.

The procedure described here also applies to the production of dyeings on fiber materials of other naturally occurring polyamides or of synthetic polyamides and polyurethanes. As a rule, the material to be dyed is introduced into the bath at a temperature of about 40° C. and is agitated therein for some time, the dyebath is then adjusted to the desired weakly acid, preferably weakly acetic acid, pH and the actual dyeing is carried out at a temperature between 60° and 98° C. However, the dyeings can also be carried out at the boiling point or in closed dyeing apparatus at temperatures up to 106° C. Since the water-solubility of the compounds is very good, they can also advantageously be employed in customary continuous dyeing processes.

The formulae shown are those of the corresponding free acids. The dyes were in general isolated and employed for dyeing in the form of alkali metal salts in particular the Na salts.

EXAMPLE 1

115 g of chloro-aluminum phthalocyanine were introduced into 600 ml of chlorosulfonic acid in the course of 30 minutes, at room temperature and while stirring. The mixture was then stirred at 136° to 138° C. for 8 hours and the cooled melt was poured onto ice. The suspension was filtered with suction and the solid product washed with ice-water until largely free from sulfate and acid. In the form of the free acid, the moist paste isolated essentially corresponded to the formula

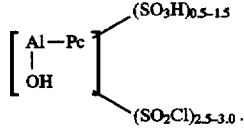

Ice-water was added to the material on the suction filter, and 11 g of ammonium chloride and 95 g of 2,4-difluoro-6-(3-aminophenyl)aminopyrimidine were then stirred in. The pH of the suspension or solution was brought to 9.8 to 10.0 in the course of 2 hours by addition of sodium hydroxide solution, the temperature simultaneously being increased to 25° C. After the reaction solution had been stirred at this temperature for a further 8 hours, it was brought to pH 7 with dilute hydrochloric acid and salted out with sodium chloride. The dye was filtered off with suction and dried in vacuo at 60° C. The dye essentially corresponded, in the form of its free acid, to the formula

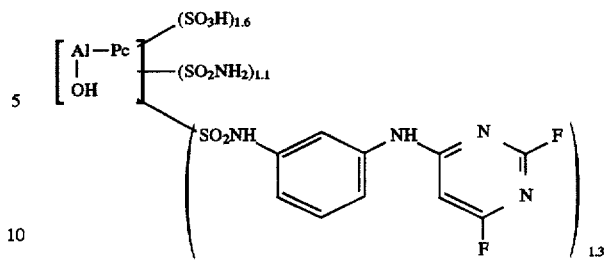

and dyed cotton in clear greenish-tinged turquoise blue shades, or gave a greenish-tinged turquoise blue print on cotton.

EXAMPLE 2

The procedure was as in Example 1, but omitting the addition of ammonium chloride. A dye of the formula

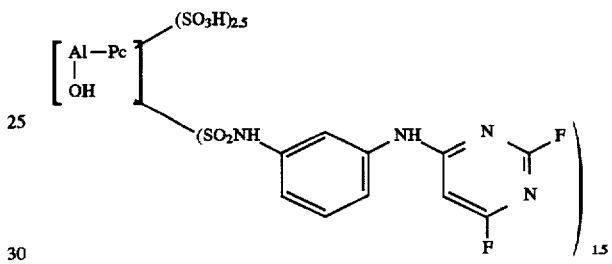

resulted which likewise dyed cotton in clear greenish-tinged turquoise blue color shades.

The degree of sulfonation and the content of sulfonamide groups in the dyes of Examples 1 and 2 can be controlled in a known manner by slight variation of the sulfochlorination conditions or by variation of the amounts of amino compounds employed.

EXAMPLE 3

The reactive dyes of Examples 1 and 2 were also prepared by reaction of 0.1 mol of a dye intermediate product of the formula

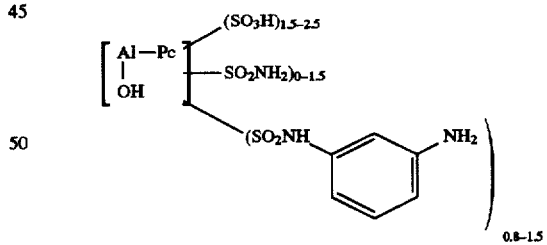

with 0.08 to 0.15 mol of 2,4,6-trifluoropyrimidine in 250 ml of water at 40° to 50° C.

The dye intermediate product employed, with the above structure, was obtained by condensation of aluminum phthalocyanine-sulfochloride with 1,3-diaminobenzene and, if appropriate, selected amounts of ammonium chloride.

EXAMPLES 4 TO 19

The following novel interesting turquoise blue reactive dyes were prepared analogously to Examples 1 to 3 by variation of the diamino compound, the amine and/or the particular reactive system:

Example 4:
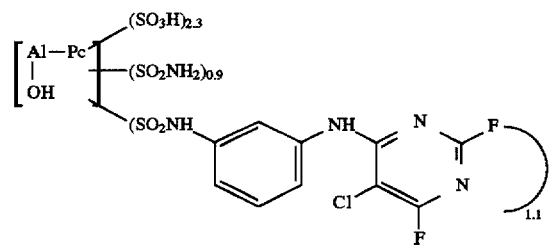
Example 5:
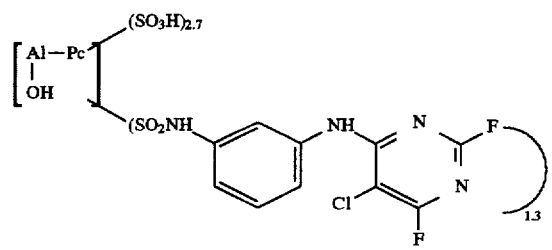
Example 6:
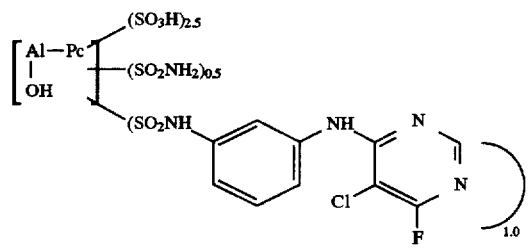
Example 7:
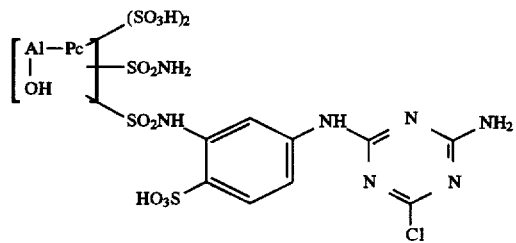
Example 8:
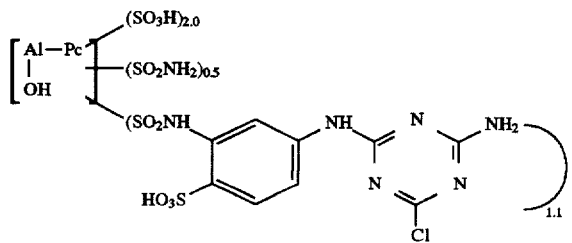

-continued
Example 9:
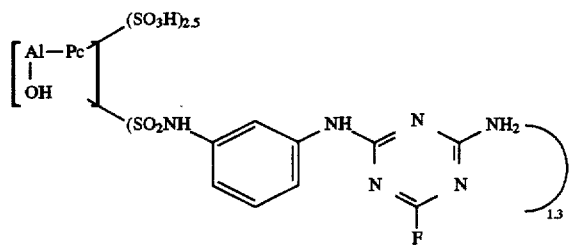
Example 10:
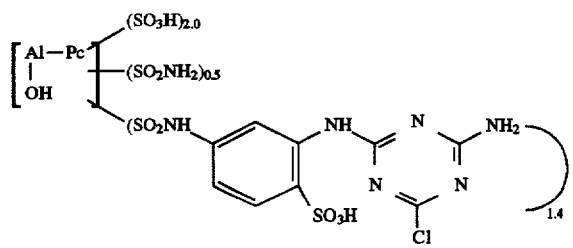
Example 11:
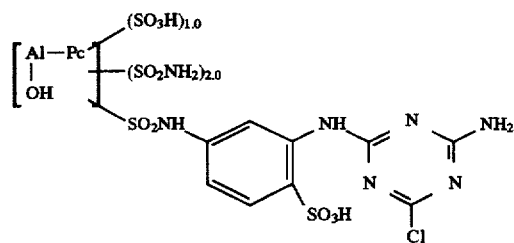
Example 12:
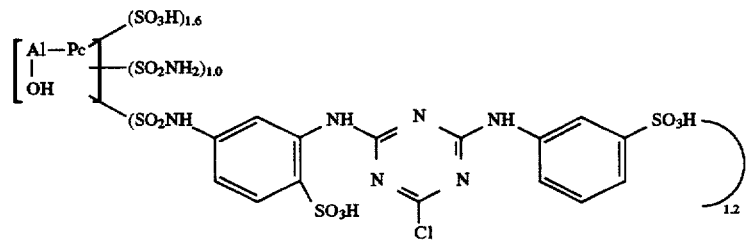
Example 13:
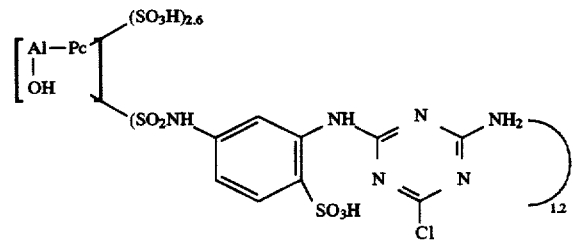

Example 14:
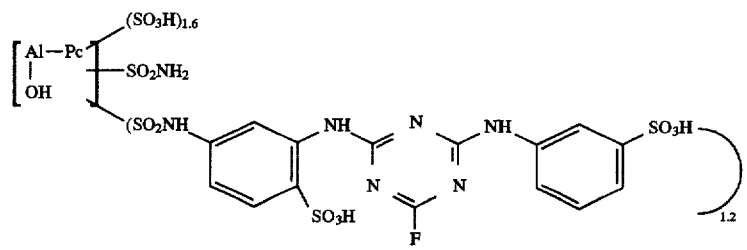
Example 15:
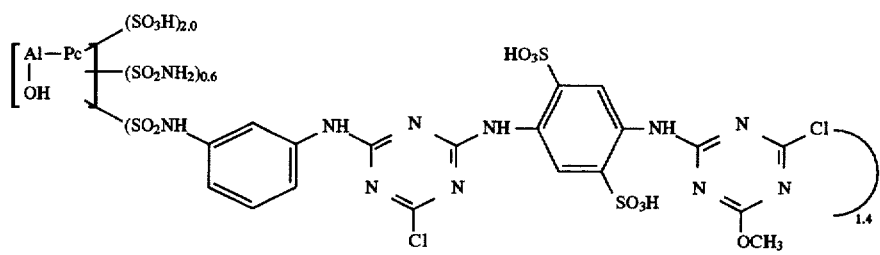
Example 16:
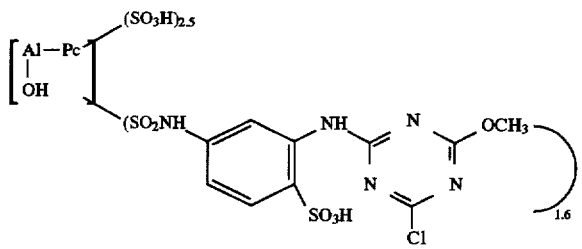
Example 17:
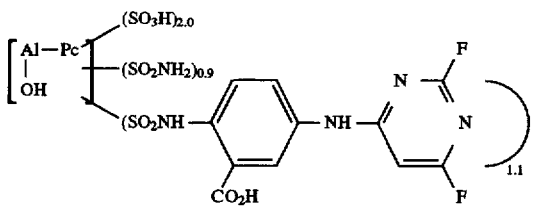
Example 18:
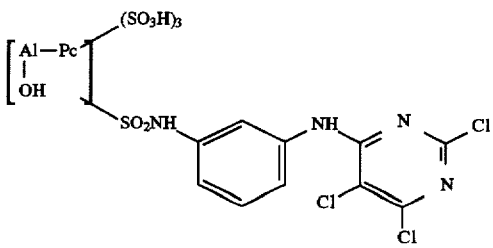

Example 19:
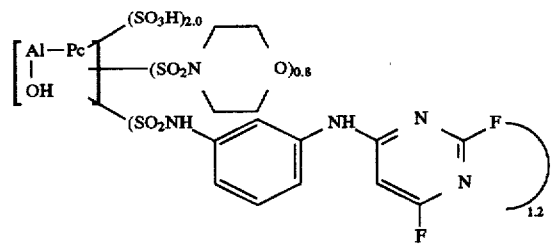
EXAMPLES 20 TO 30
The following important novel turquoise blue reactive dyes resulted by using aliphatic diamino compounds instead of the aromatic compounds analogously to Examples 1 to 3:
Example 20:
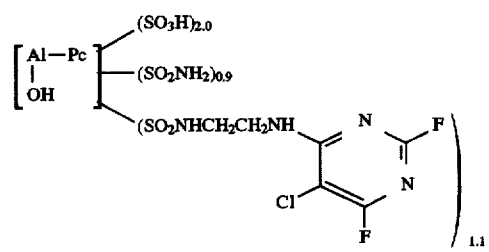
Example 21:
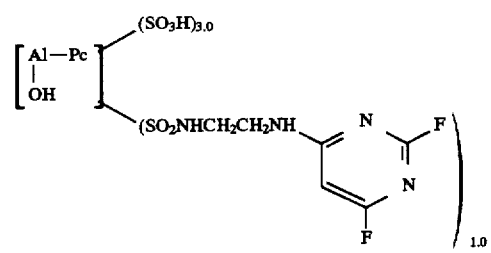
Example 22:
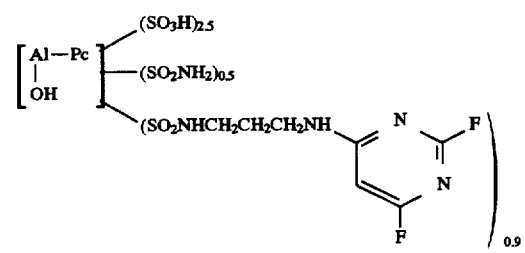
Example 23:
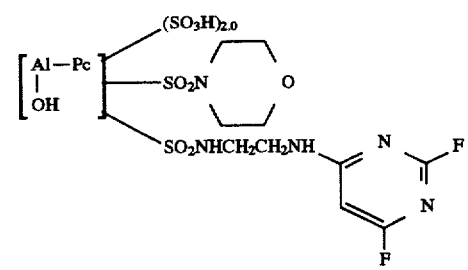

Example 24:
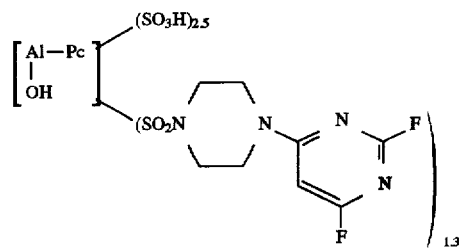
Example 25:
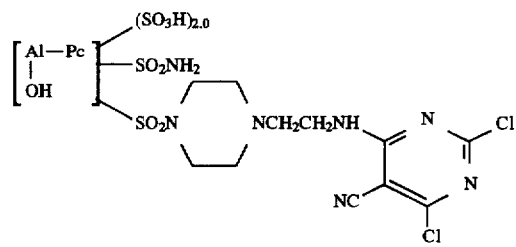
Example 26:
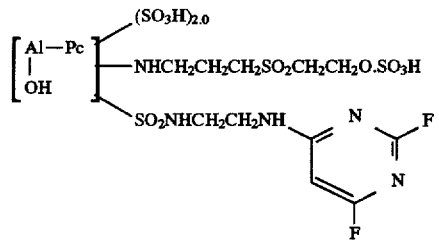
Example 27:
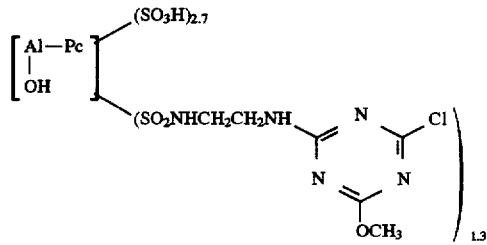
Example 28:
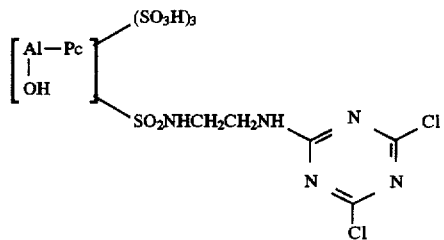

Example 29:

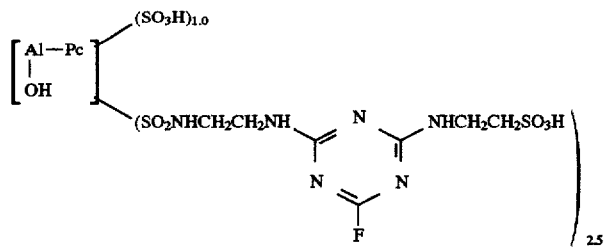

Example 30:

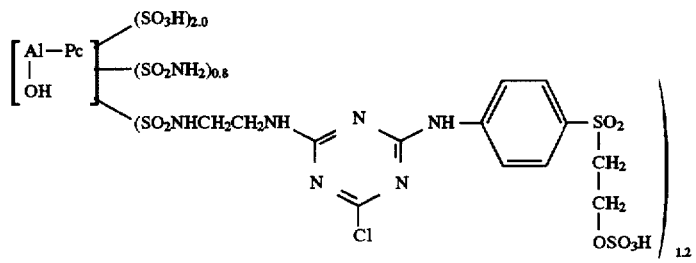

EXAMPLE 31

The hydroxy-aluminum phthalocyanine-sulfochloride prepared from 115 g of chloro-aluminum phthalocyanine according to Example 1 was stirred in 1 l of ice-water and 2 ml of pyridine. A neutral solution of 281 g of 4-(β-sulfatoethylsulfonyl)aniline in water was metered in and the pH was kept constant at 5.8 to 6.0 by simultaneous addition of solid sodium bicarbonate. The mixture was then warmed from 0° C. to 25° C. in the course of 10 hours. About 450 g of green-blue powder of the structure

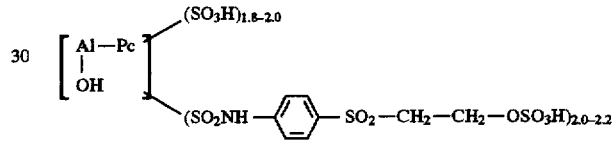

were obtained.

The following important turquoise blue reactive dyes were prepared by variation of the sulfatoethylsulfonyl-containing amine component in Example 31:

Example 32:

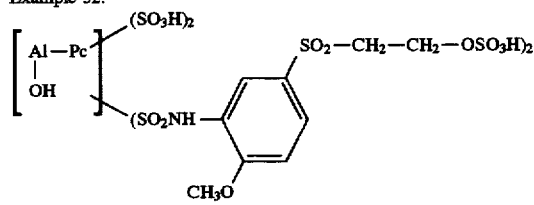

Example 33:

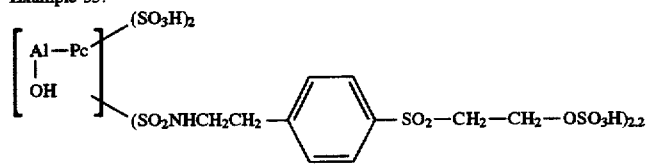

Example 34:

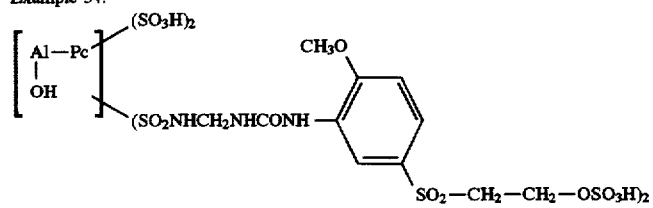

Example 35:
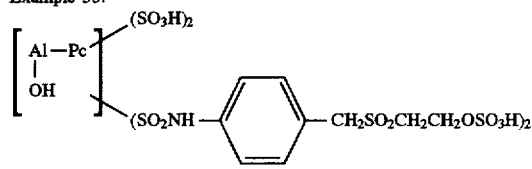

Example 36:
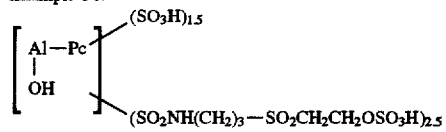

Example 37:
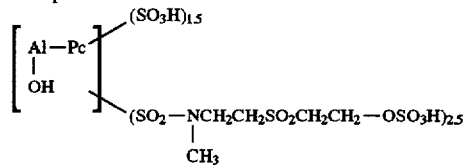

Example 38:
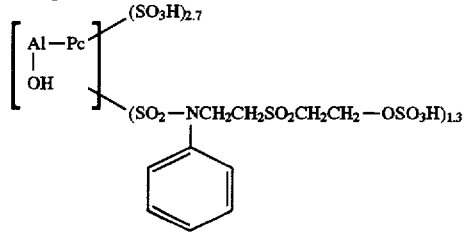

Example 39:
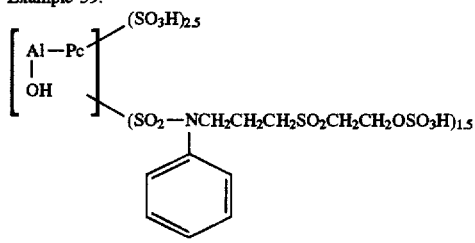

EXAMPLE 40

The hydroxy-aluminum phthalocyanine-sulfochloride prepared from 115 g of chloro-aluminum phthalocyanine according to Example 1 was stirred in 1 l of water and 2 ml of pyridine. 52 g of N-methyl-2-(β-sulfoethylsulfonyl) ethylamine and 169 g of 4-(β-sulfatoethylsulfonyl)aniline in water were metered in and the pH was kept constant at 6.5 to 6.7 by addition of a 20% strength potassium bicarbonate solution. The mixture was warmed to 25° C. in the course of 6 to 8 hours and potassium chloride was then added to the reaction solution until the dye had precipitated completely. The dye dyed cotton in a clear turquoise blue color shade by various application methods. Brilliant turquoise-colored prints are likewise possible on cotton or viscose The dye has the structure.

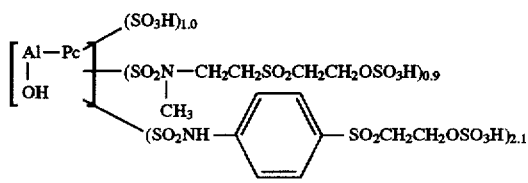

When a corresponding amount of any other amine was employed instead of N-methyl-2-(β-sulfatoethylsulfonyl) ethylamine, the following interesting turquoise blue dyes were obtained:

Example 41:
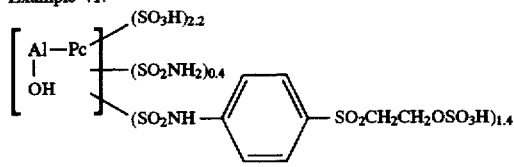
Example 42:
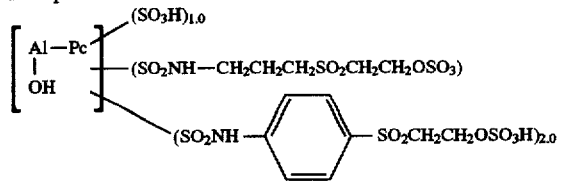
Example 43:
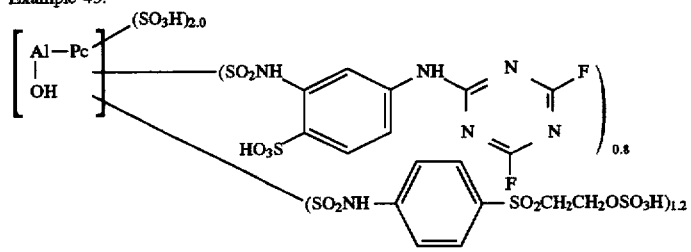
Example 44
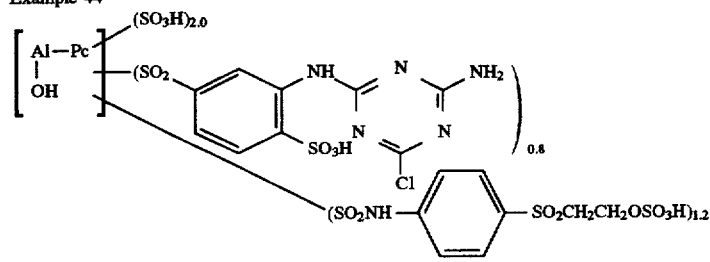
When the two amino components in Example 40 were varied, the following bifunctional turquoise-coloured reactive dyes were obtained:
Example 45:
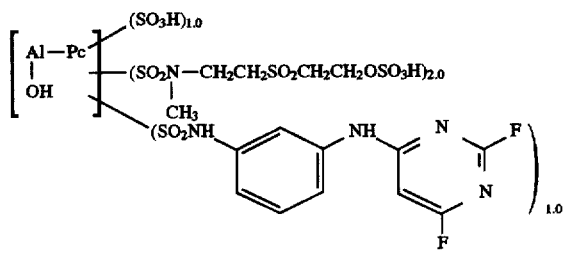
Example 46:
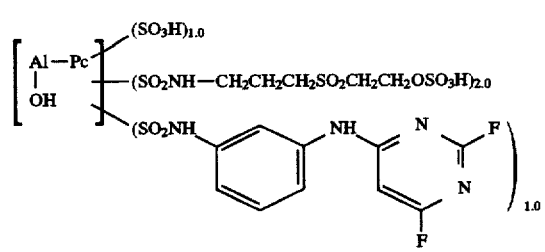
Example 47:
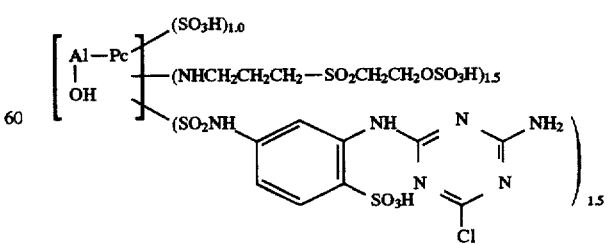

Example 48:

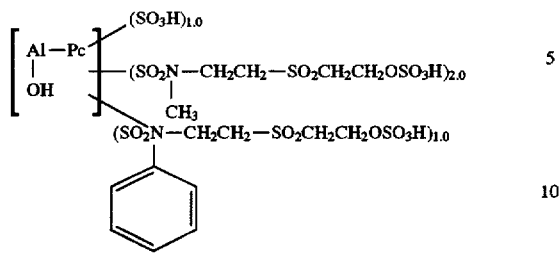

EXAMPLE 49

0.025 mol of the color base of the structure

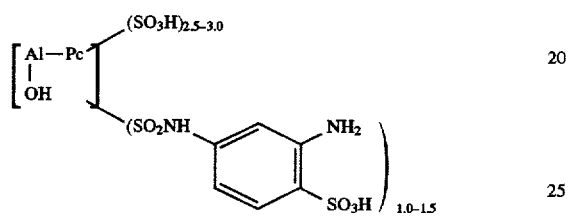

which was prepared by known methods by sulfochlorination of chloro-aluminum phthalocyanine and subsequent reaction with 1,3-diaminobenzene-4-sulfonic acid, were stirred with 0.026 mol of sodium nitrite in 150 ml of water. The solution was cooled to 0° to 2° C. and was added dropwise to a mixture of 100 g of ice/water and 12 g of 30% strength hydrochloric acid. The resulting diazonium salt suspension was allowed to run at 0° to 5° C. into a solution comprising 300 g of ice/water and 0.025 mol of 1-(3-methylaminopropyl)-2-hydroxy-4-methyl-2-pyridone. At the same time, the pH was controlled at 9.0 to 9.5 by addition of 20% strength sodium hydroxide solution. The resulting green solution was reacted with 2,4,6-trifluoropyrimidine by customary processes (analogously to Example 3) to give the dye of the structure

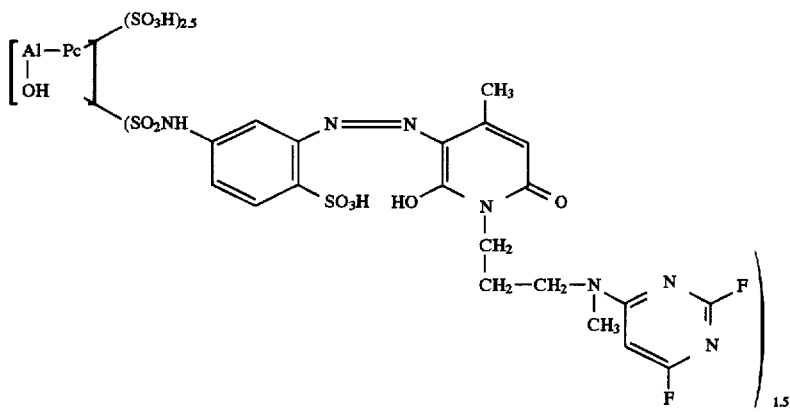

The dye dyed cellulose material in brilliant green color shades.

Further important green dyes were accessible by variation of the coupling component:
Example 50:
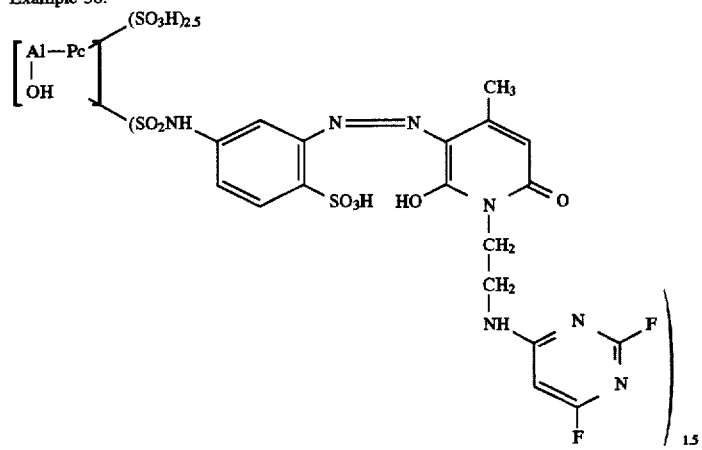
Example 51:
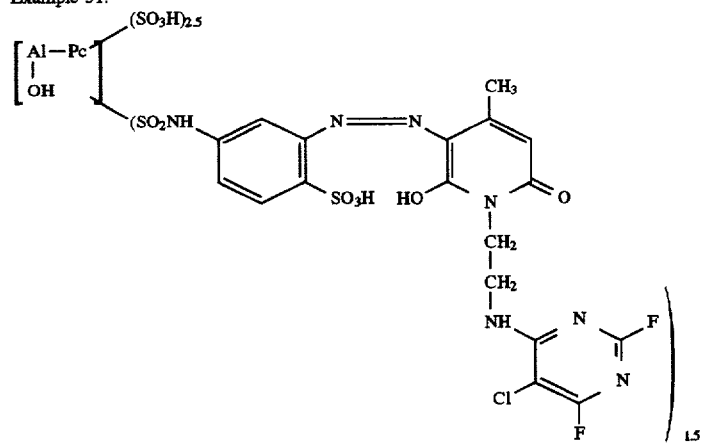
Example 52:
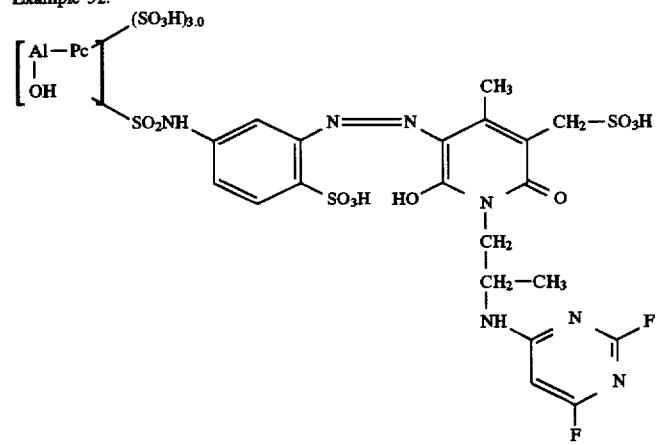
EXAMPLE 53
When a β-sulfatoethylsulfonyl-containing pyrazolone was chosen as the coupling, component in Example 49, the final condensation with halogenopyrimidines was omitted, and a brilliant green reactive dye

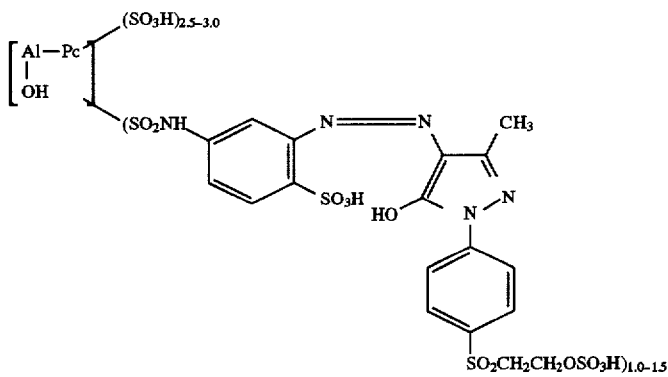

was thus obtained directly.

Summary of the $\lambda_{max}$ values, measured in water as the solvent:

| Example | $\lambda_{max}$ |
|---|---|
| 1 | 609.677 nm |
| 2 | 609.677 nm |
| 6 | 609.678 nm |
| 9 | 642.674 nm |
| 31 | 608.679 nm |
| 36 | 609.678 nm |
| 37 | 609.678 nm |
| 38 | 612.680 nm |
| 45 | 609(sh).677 nm |

What is claimed is:

1. An aluminium phthalocyanine reactive dye which, in the form of the free acid, corresponds to the following structure

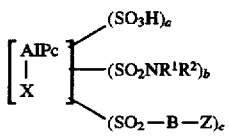
(1)

in which
a is a number from 0 to 3,
b is a number from 0 to 2,
c is a number from 0.5 to 3,
Pc is a phthalocyanine radical,
$R^1$ and $R^2$ independently of one another are H, $C_1-C_6$-alkyl, substituted $C_1-C_6$-alkyl, phenyl, substituted phenyl or a fiber-reactive radical with a sulfonyl group, or $NR^1R^2$ together is the radical of a saturated heterocyclic ring system,
B is an N-containing bridge member which is linked to the $SO_2$ radical via an N atom,
Z is a fiber-reactive radical,
X is OH, $OR^3$, a phthalocyanine radical linked via a bonding member or an anion and
$R^3$ is $C_1-C_6$-alkyl, substituted $C_1-C_6$-alkyl, phenyl or substituted phenyl.

2. A reactive dye as claimed in claim 1, in which the sum of a +b+c is not less than 2 and not greater than 4.

3. A reactive dye according to claim 1, in which $R^1$ and $R^2$ independently of one another are H, $C_1$14 $C_6$-alkyl, $C_1-C_6$-alkyl which is substituted by a substituent selected from the group consisting of OH, $SO_3H$, $CO_2H$ and, $OSO_3H$, or are phenyl or phenyl which is substituted by a substituent selected from the group consisting of OH, $SO_3H$ and $CO_2H$.

4. A reactive dye according to claim 1, in which $R^1$ or $R^2$ or both are a radical of the following structure

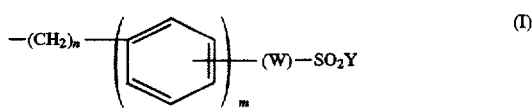
(I)

in which
n is 0 to 3,
m is 1 or 1
but n+m 1, 2, 3 or 4,
W is $-(CH_2)_{1-6}$, $-(CH_2)_2-O-(CH_2)_2-$ or a direct bond and
Y is $CH=CH_2$, $CH_2CH_2Cl$, $CH_2CH_2OH$ or $CH_2CH_2OSO_3H$.

5. A reactive dye according to claim 1, in which the group $NR^1R^2$ is

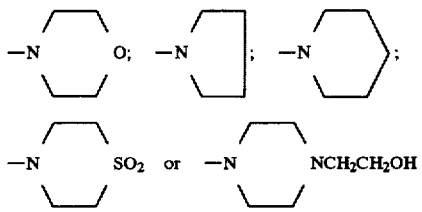

6. A reactive dye as claimed in claim 1, in which X is a radical of the formula OH, $OR^3$ or

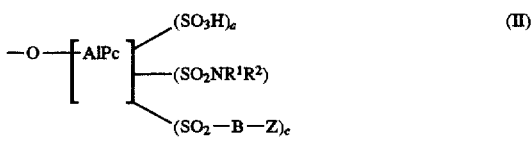
(II)

in which the substituents $R^1$ and $R^2$, B and Z and the indices a, b and c have one of the meanings given for these in claim 1.

7. A reactive dye as claimed in claim 1, in which

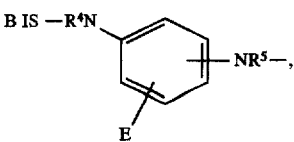

$-NR^4-(CH_2)_{2-6}-NR^5-$,

-continued

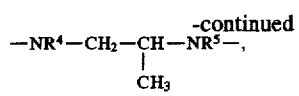

or

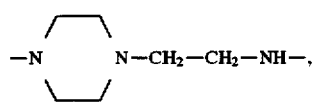

in which $R^4$ and $R^5$ independently of one another are H, $CH_3$, $C_2H_5$, $CH_2CH_2OH$, $CH_2CO_2H$ or $CH_2CH_2CO_2H$ and E is H, $SO_3H$, $CO_2H$, $CH_3$, $C_2H_5$, $CH_3O$ or $C_2H_5O$, and Z is a fiber-reactive heterocyclic radical.

8. A reactive dye as claimed in claim 1, in which Z is a fiber-reactive triazine, pyrimidine or quinoxaline which contains only halogen or halogen and an amino group as substituents.

9. A reactive dye as claimed in claim 1, in which —B—Z is a radical of the following formulae (III), (IV) and (V)

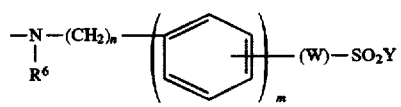 (III)

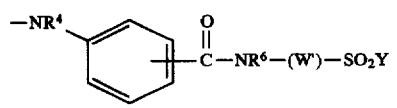 (IV)

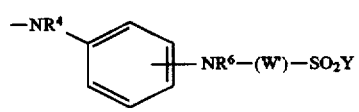 (V)

in which n is 0 to 3, m is 0 or 1 but n+m 1, 2, 3 or 4,

W is —$(CH_2)_{1-6}$, —$(CH_2)_2$—O—$(CH_2)_2$— or a direct bond,

Y is $CH=CH_2$, $CH_2CH_2Cl$, $CH_2CH_2OH$ or $CH_2CH_2OSO_3H$, $R^4$ is H, $CH_3$, $C_2H_5$, $CH_2CH_2OH$, $CH_2CO_2H$ or $CH_2CH_2CO_2$,

W' is —$(CH_2)_{2-3}$—, —$(CH_2)_2$—O—$(CH_2)_2$— or phenylene, $R^6$ is H, $CH_3$, $C_2H_5$, phenyl, sulfophenyl or a radical of the formula (I) where m =0, and the other substituents and indices a, b, c, $R^1$, $R^2$ and X have the meaning given in claim 1.

10. A reactive dye as claimed in claim 1, in which the fiber-reactive radical Z has the following meaning:

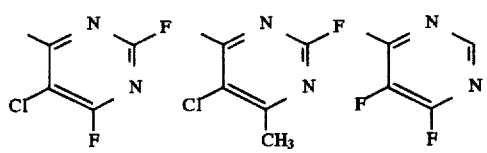

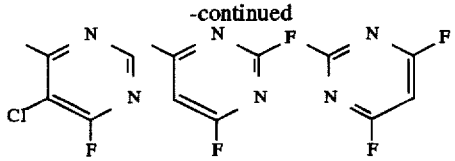

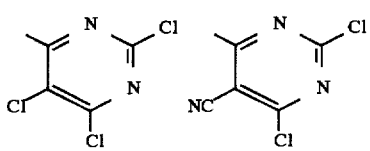

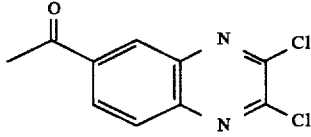

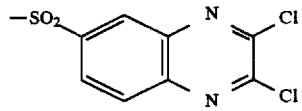

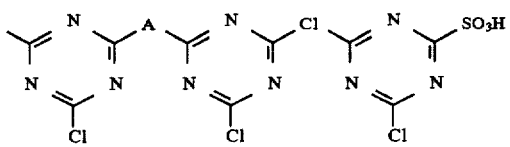

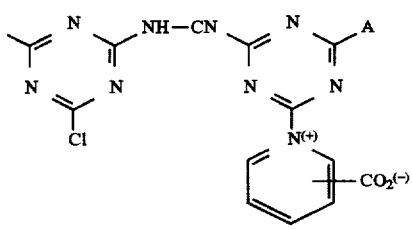

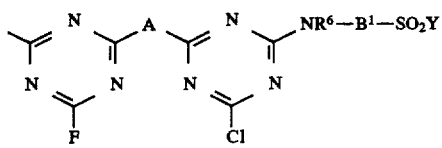

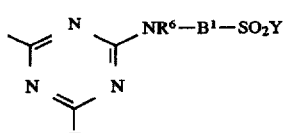

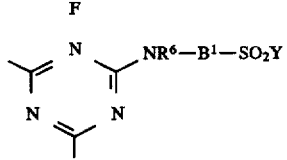

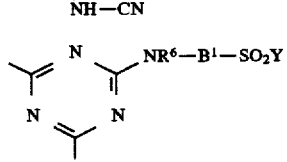

in which A is $NH_2$, $NHR^7$, $NR^7R^8$, OH, $OR^7$, SH, $SR^7$, $SO_2R^7$, $$-N\diagdown O; \quad -N\diagdown \quad ; \quad -N\diagdown \diagup$$

$$-N\diagdown SO_2 \quad or \quad -N\diagdown NCH_2CH_2OH$$

and $R^7$, $R^8$ independently of one another are $C_1$–$C_6$-alkyl, $C_1$–$C_6$-alkyl which is substituted by a substituent selected from the group consisting of OH, $SO_3H$, $OSO_3H$ and $CO_2H$ or are phenyl or naphthyl, or phenyl or naphthyl which is substituted, optionally polysubstituted, by OH, $SO_3H$ or $CO_2H$, and $B^1$ is alkylene, phenylene or naphthylene, specifically —$(CH_2)_2$—, —$(CH_2)_3$— or —$(CH_2)_2$—O—$(CH_2)_2$—,

[phenylene, naphthylene, and sulfonated naphthylene structures]

$R^6$ is H, $CH_3$, $C_2H_5$, phenyl, sulfophenyl or a radical of the formula (I) where m=0 and

Y is $CH=CH_2$, $CH_2CH_2Cl$, $CH_2CH_2OH$ or $CH_2CH_2OSO_3H$.

11. A reactive dye as claimed in claim 1, in which the bridge member B has the meaning of a radical of the formula (VI)

$$-NH-\underset{(SO_3H)_{0,1\,or\,2}}{\bigcirc}-N=N-K- \quad (VI)$$

in which the fiber-reactive radical Z is bonded to K, and

K is a coupling component from the series consisting of pyrazolones, pyridones, naphthols, aminonaphthols and amino- and diaminobenzenes, specifically a pyridone of the structure

[pyridone structure with substituents $CH_3$, (H, $SO_3H$, $CH_2SO_3H$, $CONH_2$, $CH_2CO_2H$), HO, N, O, $(CH_2)_{2-4}$, $NR^4$—*]

in which the asterisk* marks the linkage position with the fiber-reactive radical Z.

12. A process for the preparation of a compound of the formula 1

$$\left[AlPc\underset{X}{|}\right]\diagup\substack{(SO_3H)_a \\ -(SO_2NR^1R^2)_b \\ (SO_2-B-Z)_c} \quad (1)$$

which comprises reacting an aluminum phthalocyanine-sulfonic acid chloride of the formula $$\left[\underset{X}{\overset{Al-Pc}{|}}\right]\diagup\substack{(SO_3H)_p \\ (SO_2Cl)_q} \quad (8)$$

in which
p is 0 to 3 and
q is 1 to 4, with the proviso that p+q=2, 3 or 4,
with an amines of the formula (9)

$$H-B-Z \quad (9)$$

and if appropriate with an amines of the formula (10)

$$HNR^1R^2 \quad (10)$$

and then hydrolyzing any sulfonic acid chloride groups still present, or subjecting a compound of the formula (11)

$$\left[AlPc\underset{X}{|}\right]\diagup\substack{(SO_3H)_a \\ -(SO_2NR^1R^2)_b \\ (SO_2-B-H)_c} \quad (11)$$

to a condensation reaction on an N atom in B with a triazine, pyrimidine or quinoxaline reactive component of the formula (12)

$$Z-Hal \quad (12)$$

in which Hal is Cl, Br or F, hydrogen halide being split off, the other substituents and indices having the meaning given in claim 1.

13. A process for dyeing or printing materials containing hydroxyl or amide groups with a reactive dye, which comprises allowing a reactive dye as claimed in claim 1 to act on the material.

14. A reactive dye of the formulae (2) to (7)

$$\left[\underset{OH}{\overset{AlPc}{|}}\right]\diagup\substack{(SO_3H)_{1-3} \\ -(SO_2NH_2)_{0-1} \\ SO_2-B^2-[\text{pyrimidine with F, (H, Cl), F, N}]}_{0.5-2} \quad (2)$$

in which $B^2$ is $HN-\bigcirc-NH$, $HN-\underset{SO_3H}{\bigcirc}-NH$,

-continued
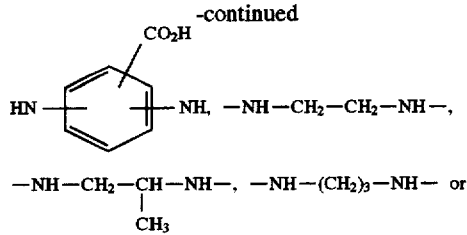
—NH—CH₂—CH₂—NH—,
—NH—CH₂—CH—NH—, —NH—(CH₂)₃—NH— or
　　　　　｜
　　　　CH₃
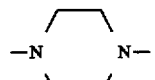
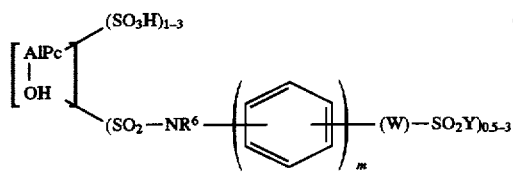 (3)
in which
R⁶ is H, CH₃, C₂H₅, phenyl, sulfophenyl or a radical of the formula (I) where m=0,
Y is CH=CH₂, CH₂CH₂Cl, CH₂CH₂OH or CH₂CH₂OSO₃H, and
m is 0 or 1,
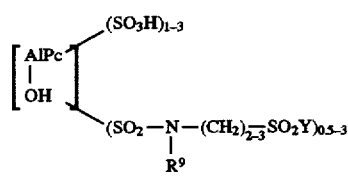 (3a)
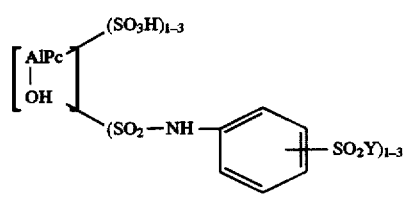 (3b)
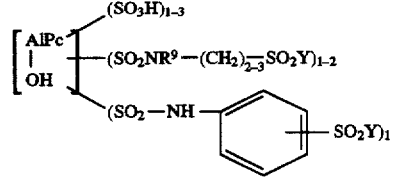 (3c)
in which R⁹ is H, CH₃, C₂H₅, phenyl, —(CH₂)₂₋₃—SO₂Y
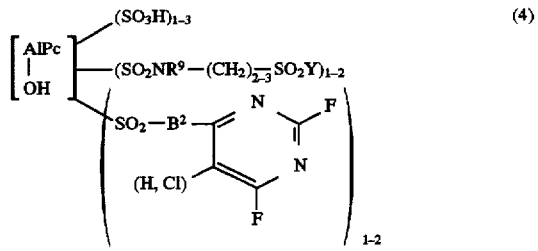 (4)
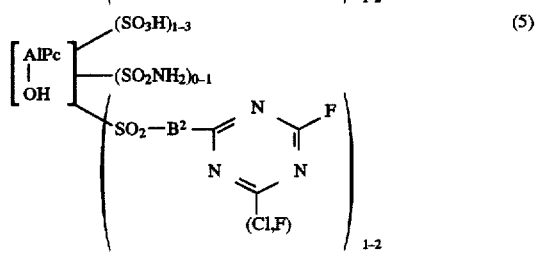 (5)
in which A has the meaning given in claim 10,
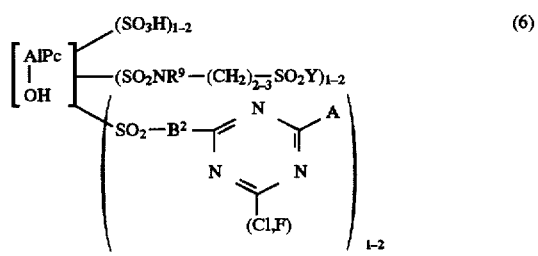 (6)
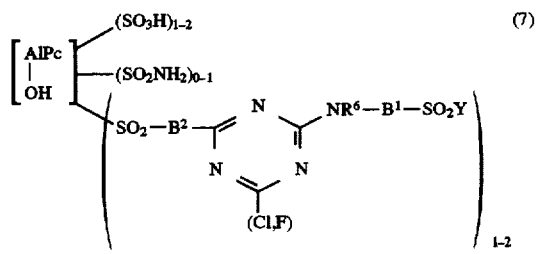 (7)
in which
B¹ has the meaning given in claim 10.
* * * * *